United States Patent
Shen (10) Patent No.: US 12,254,657 B2
(45) Date of Patent: Mar. 18, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yangtai Shen, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 465 days.

(21) Appl. No.: 17/726,588

(22) Filed: Apr. 22, 2022

(65) Prior Publication Data
US 2022/0343619 A1    Oct. 27, 2022

(30) Foreign Application Priority Data

Apr. 27, 2021   (JP) .................................. 2021-074870

(51) Int. Cl.
*G06V 10/25* (2022.01)
*G06N 3/045* (2023.01)
*G06V 10/776* (2022.01)
*G06V 10/82* (2022.01)

(52) U.S. Cl.
CPC ............. *G06V 10/25* (2022.01); *G06N 3/045* (2023.01); *G06V 10/776* (2022.01); *G06V 10/82* (2022.01)

(58) Field of Classification Search
CPC ........... G06V 10/25–273; G06V 10/82; G06V 10/776; G06N 3/045; G06T 7/10–194
See application file for complete search history.

(56) References Cited

U.S. PATENT DOCUMENTS

| | | | |
|---|---|---|---|
| 2013/0336582 A1* | 12/2013 | Dai | G06V 10/26 382/165 |
| 2021/0104050 A1* | 4/2021 | Ito | G06T 7/194 |
| 2021/0158534 A1* | 5/2021 | Kakinuma | G06V 10/82 |
| 2021/0366129 A1* | 11/2021 | Yamauchi | G06T 7/136 |
| 2022/0156944 A1* | 5/2022 | Zhang | G06T 7/20 |
| 2022/0343619 A1* | 10/2022 | Shen | G06N 3/045 |
| 2022/0383507 A1* | 12/2022 | Kajimura | G06T 7/194 |
| 2022/0398742 A1* | 12/2022 | Zhang | G06T 7/194 |
| 2023/0245293 A1* | 8/2023 | Tang | G06V 10/26 382/103 |
| 2024/0078680 A1* | 3/2024 | Zheng | G06T 7/11 |

FOREIGN PATENT DOCUMENTS

JP    2020-091543 A    6/2020

* cited by examiner

*Primary Examiner* — Sean T Motsinger
(74) *Attorney, Agent, or Firm* — Carter, DeLuca & Farrell LLP (57) ABSTRACT

The disclosed technique detects a foreground region accurately even with a neural network. A first region detection unit detects, by a DNN, a predetermined foreground region in an inputted image. A weak region identification unit detects, by a DNN, a weak region having a possibility that misdetection or non-detection occurs during the region detection on the inputted image using a DNN that has the same detection target as that of the DNN of the first region detection unit. A second region detection unit detects, by a method other than a neural network, a foreground region that is a detection target same as that of the first region detection unit in the weak region detected by the weak region identification unit within the inputted image read from an input device. An integration unit integrates detection results by the first region detection unit and by the second region detection unit.

10 Claims, 11 Drawing Sheets

FIG.10

IMAGE PROCESSING APPARATUS, IMAGE PROCESSING METHOD, AND STORAGE MEDIUM

BACKGROUND

Field

The present disclosure relates to an image processing technique of detecting a foreground region from an image.

Description of the Related Art

A technique of detecting a foreground region (for example, a person, a car, and the like) in an image obtained by an image capturing device or the like is a fundamental technique in the computer vision field and the computer graphics field. For example, with the obtainment of a captured image by image-capturing by an in-vehicle image capturing device and the detection of a region in which a vehicle around a host vehicle exists in the captured image, a distance to the detected vehicle can be monitored. Additionally, with a foreground region such as a person and an object being extracted from a multi-viewpoint image and processed, a three-dimensional shape of the person, object, or the like can be generated.

In recent years, a foreground region detection technique using a deep neural network (DNN) has been attracting attention with the evolution of the deep learning techniques and the improvement in the performance of hardware. The DNN includes an input layer to which data is inputted, multiple intermediate layers that extract and analyze the features of the inputted image, and an output layer that outputs a detection result. With the DNN being caused to learn an enormous amount of data for learning in advance, the foreground region detection using the DNN can have a higher accuracy and versatility than that of a conventional method.

For the improvement in the learning efficiency of the DNN, Japanese Patent Laid-Open No. 2020-91543 discloses a method of performing the learning by two types of DNNs, which are the same type and their detection targets that are foreground regions are related to each other, based on respective detection results of the two types of DNNs and a detection error of one detection result.

However, the DNN has a limitation in the detection accuracy because of the dependency on a network structure of the DNN such as the number of layers, the number of neurons forming each layer, and the connection relationship between the neurons. For this reason, even with the multiple times of learning by the DNNs having the same network structure, it is difficult in some cases to enhance the accuracy of the foreground region detection.

SUMMARY

One aspect of the present disclosure is an image processing apparatus including: at least one processor or circuit configured to function as: a first foreground region detection unit that detects, based on a first neural network, a first foreground region in an inputted image; a partial region identification unit that identifies, based on a second neural network, a partial region in the inputted image in which a foreground region is detected by a method other than a neural network; a second foreground region detection unit that detects, based on a detection result by a method other than a neural network, a second foreground region in the partial region; and an output unit that outputs, based on the first foreground region, the partial region, and the second foreground region, a third foreground region indicating a foreground region in the inputted image.

Further features of the present invention will become apparent from the following description of exemplary embodiments with reference to the attached drawings.

DESCRIPTION OF THE EMBODIMENTS

Embodiments of the present disclosure are described below with reference to the drawings. The following embodiments are not intended to limit the present disclosure, and all the combinations of the features described in the present embodiments are not necessarily required for a means of solving the present disclosure. The same configurations are described with the same reference signs assigned thereto. Terms that are different in only the alphabet assigned after the number of the reference sign indicate a different instance of a device having the same function.

Embodiment 1

In the present embodiment, a foreground region is extracted from an inputted image by using a DNN, and for a partial region that has a possibility that the non-detection or misdetection occurs in the DNN (hereinafter, referred to as a weak region), a foreground region is extracted by using a method other than a neural network including the DNN.

Figure 10:
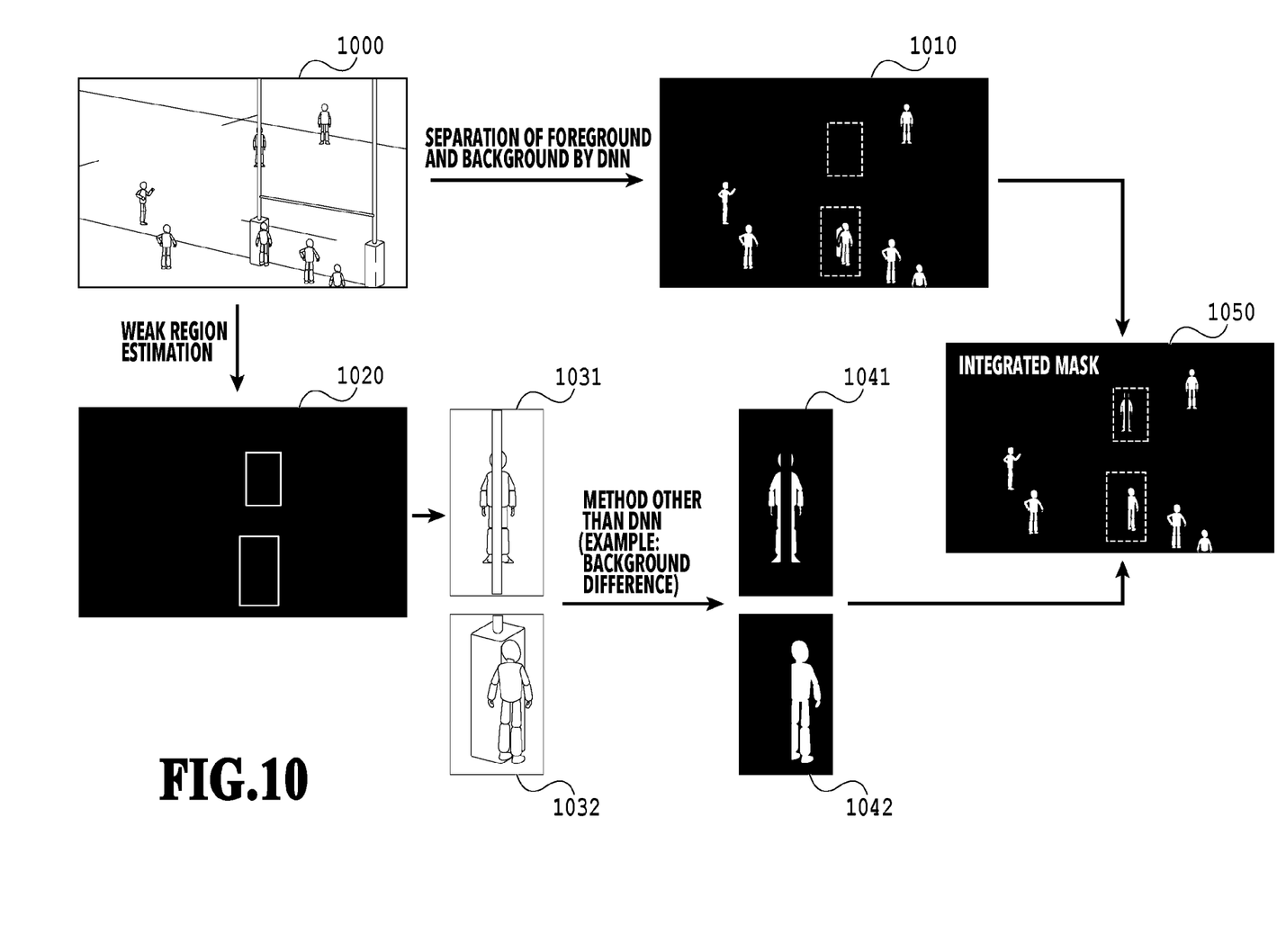
FIG. 10 is a diagram describing a region detection method according to the present embodiment.

FIG. 10 illustrates a diagram describing an overview of a region detection method according to the present embodiment. First, a mask image 1010 indicating a foreground region with a blank image is obtained from a detection result by a DNN that sets a human body region in an image 1000 as the detection target. The non-detection and misdetection of the foreground region occur in regions each surrounded by a broken line in the mask image 1010.

In the present embodiment, concurrently with the obtainment of the mask image 1010, an image 1020 is obtained from a detection result by a DNN that sets, as the detection target, a weak region, which has a possibility that the misdetection or non-detection occurs in the DNN that sets the human body region as the detection target. The image 1020 indicates the weak region with a rectangle. Next, the human body region is detected by using a region detection method that uses no DNN from weak region portions 1031 and 1032 in the inputted image 1000, and thus mask images 1041 and 1042 are obtained.

Then, a mask image 1050 is generated by combining and integrating the mask image 1010 and the mask images 1041 and 1042 with each other. In the mask image 1050, the regions each surrounded by a broken line in the mask image 1010 are corrected with the mask images 1041 and 1042, and thus the mask image 1050 is a mask image in which the human body region is detected with higher accuracy than that in the mask image 1010. Accordingly, in the present embodiment, it is possible to improve the detection accuracy of the region detection using the DNN.

[Configuration]

The present embodiment is described with reference to the drawings.

Figure 1:
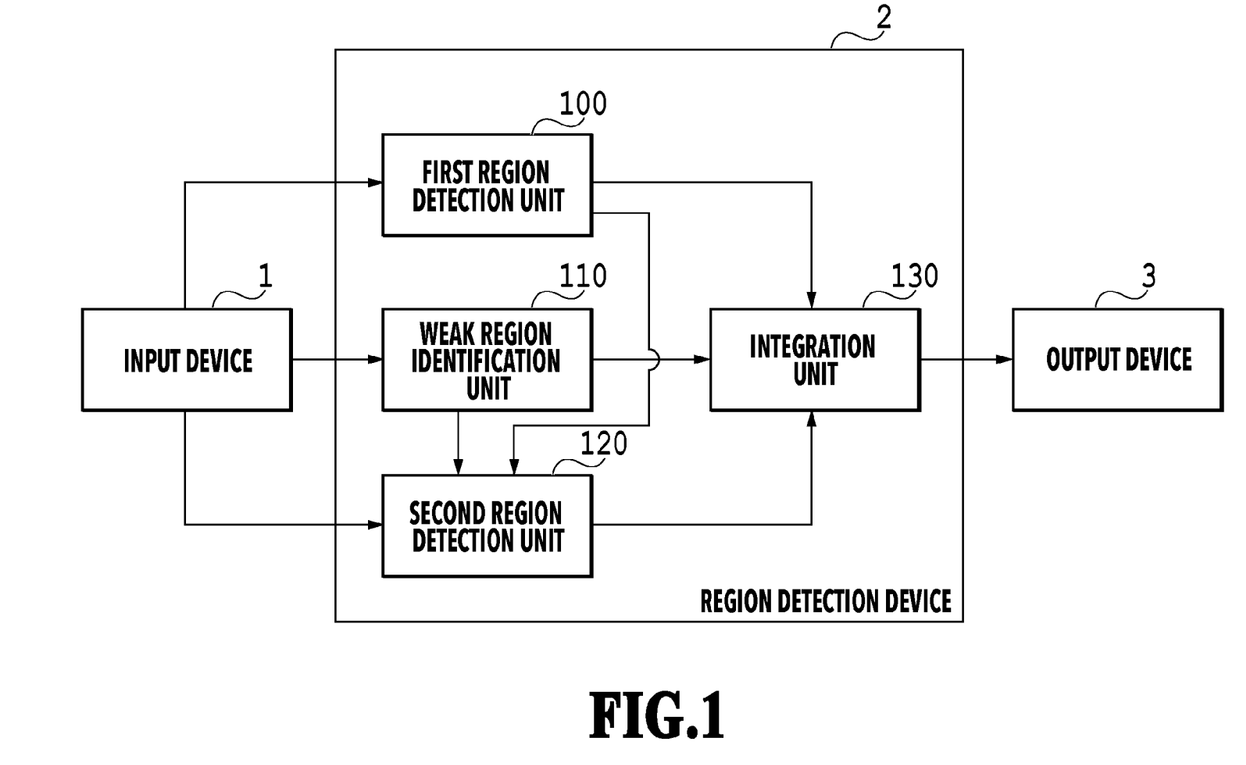
FIG. 1 is a configuration diagram of a region detection device in Embodiment 1.

FIG. 1 is a configuration diagram of an input device 1, a region detection device 2, and an output device 3 in the present embodiment. The region detection device 2 is connected to the input device 1 and the output device 3. A region detection system in the present embodiment has a configuration that an image on which the region detection is to be performed is obtained from the input device 1, the region detection device 2 detects a predetermined foreground region from the obtained image, and the detection result of the foreground region is outputted to the output device 3.

The input device 1 may be an image capturing device that outputs an image obtained by image-capturing a target region, or may be an information processing device or a storage device such as a server that outputs an image stored in advance.

The region detection device 2 includes a first region detection unit 100, a weak region identification unit 110, a second region detection unit 120, and an integration unit 130. The region detection device 2 performs the region detection on the image obtained from the input device 1 and outputs the detection result to the output device 3. Details of the region detection device 2 are described later with reference to FIG. 1.

The output device 3 may be a display that displays the detection result outputted from the region detection device 2 or an arbitrary device that performs other processing.

The first region detection unit 100 detects a foreground region in the image by using a DNN and outputs first foreground region information indicating the foreground region as a detection result. The foreground region can be, for example, an image region corresponding to a vehicle in an image that is obtained by image-capturing a road on which the vehicle is traveling, or can be an image region corresponding to a ball and a player in an image obtained by image-capturing a sporting event.

Figure 2A:
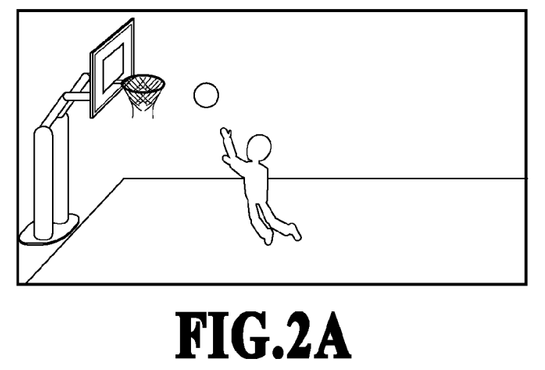
FIG. 2A is an inputted image and a region detection result in Embodiment 1.
Figure 2B:
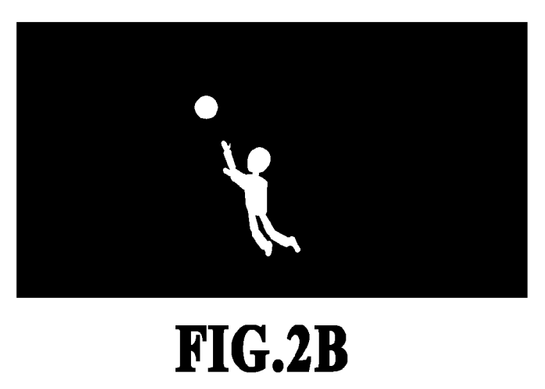
FIG. 2B is the inputted image and the region detection result in Embodiment 1.
Figure 2C:
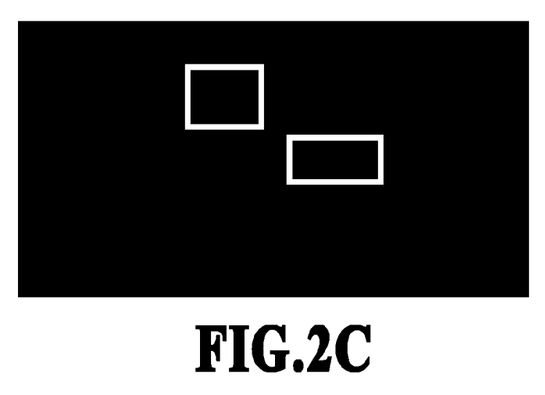
FIG. 2C is the inputted image and the region detection result in Embodiment 1.

FIGS. 2A to 2C illustrate examples of the inputted image, an image indicating the detected foreground region, and an image indicating the weak region. FIG. 2A is an example of the image that is outputted from the input device 1 and inputted to the region detection device 2. FIG. 2B is an example of a binary image indicating the foreground region that is the detection result by the first region detection unit 100. The detection result by the first region detection unit 100 in FIG. 2B is an example with no occurrence of the non-detection nor misdetection. FIG. 2C is an example of a binary image indicating the weak region of the first region detection unit 100 that is a detection result by the weak region identification unit 110 with a rectangle. The weak region in this case is a partial region that has a possibility that the misdetection or non-detection of the foreground region as the detection target occurs in the DNN used by the first region detection unit 100.

Figure 3A:
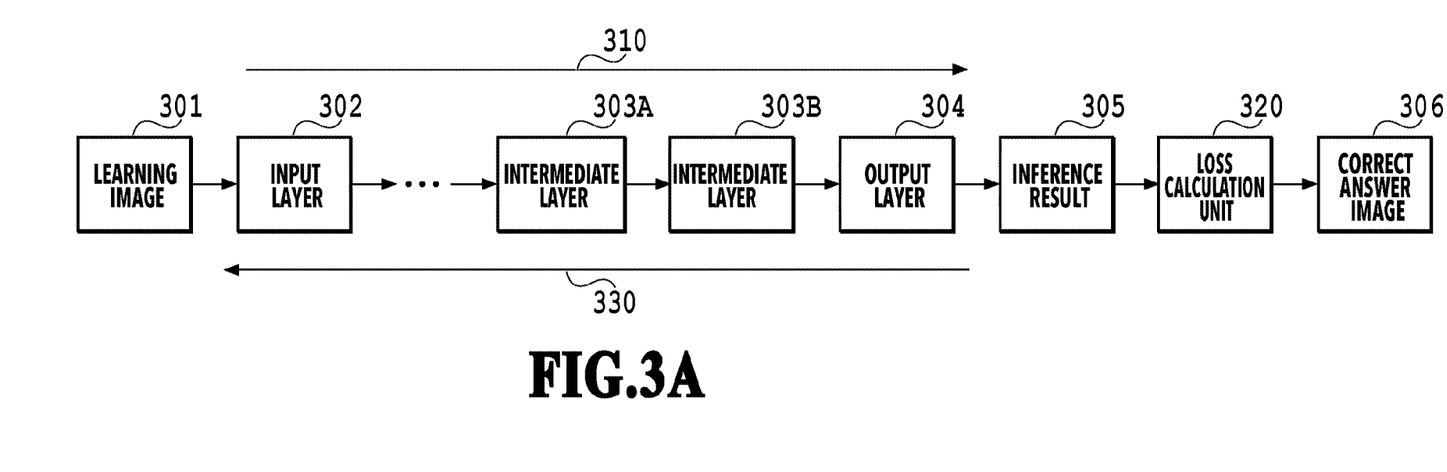
FIG. 3A is a diagram illustrating learning processing and inference processing by a deep neural network in Embodiment 1.
Figure 3B:
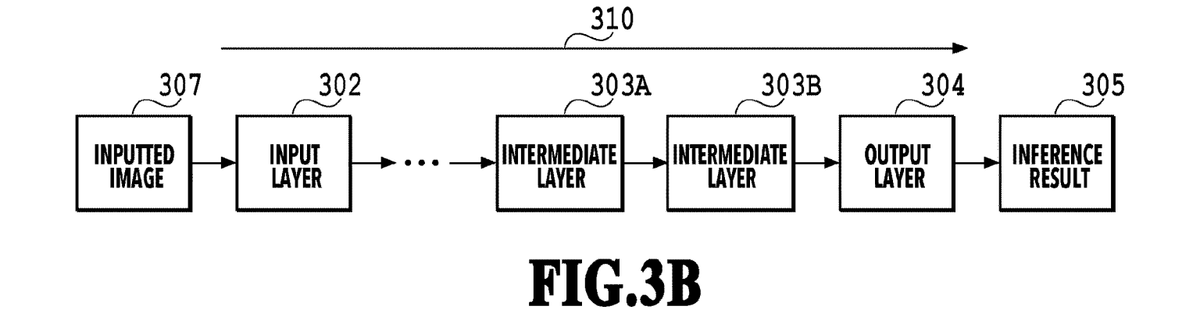
FIG. 3B is a diagram illustrating the learning processing and the inference processing by the deep neural network in Embodiment 1.

Next, region detection processing by using a DNN is described with reference to FIGS. 3A and 3B. The processing using a DNN includes a learning stage and an inference stage. FIG. 3A illustrates processing of the learning stage of a DNN, and FIG. 3B illustrates processing of the inference stage by the DNN after the learning.

Each layer of an input layer 302, intermediate layers 303A and 303B, and an output layer 304 forming the DNN holds weight and bias and performs outputting based on the bias and the sum of each input from previous layers that is multiplied by corresponding weight. The input to each layer may be an output from an immediately previous layer or a further previous layer, and may be an input independent of another layer. The input layer 302, the intermediate layers 303A and 303B, and the output layer 304 may have the same structure or different structures.

In the learning stage illustrated in FIG. 3A, first, as indicated by a processing direction 310, a learning image 301 is inputted to the input layer 302 of the DNN and passes through the intermediate layers 303A and 303B, and an inference result of the region detection is outputted from the output layer 304. In the present embodiment, the inference result is outputted in the form of a probability map. The probability map includes values each corresponding to each pixel of the learning image 301, and each value represents the probability that the corresponding pixel exists in a region of the detection target. Each value of the probability map is closer to 1 as the probability that the detection target exists in the corresponding pixel is high and is closer to 0 as the probability that the detection target exists in the corresponding pixel is low. However, the form of the detection result is not limited to the probability map.

Next, in a loss calculation unit 320, an inference result 305 obtained by the processing in the processing direction 310 is compared with a correct answer image 306 as training data in the region detection for the learning image 301, and a loss is calculated from an error map indicating an error of the inference result for each pixel. As the loss calculated by the loss calculation unit 320, for example, a cross entropy error can be used, and another index may also be used depending on the detection target.

Next, based on the loss calculated by the loss calculation unit 320, processing in a processing direction 330, that is, processing using a backpropagation method is performed, and the weight and bias of each layer are updated such that the loss is the minimum. Then, a DNN that performs the learning by the processing with the above-described learning stage can detect a region in which a predetermined object as the detection target is captured.

Then, as illustrated in FIG. 3B, in the inference stage, an inference result of the region detection using the DNN that has the weight and bias of each layer obtained in the learning stage for the inputted image, that is, information indicating the region in which the predetermined object as the detection target is captured is outputted.

The weak region identification unit 110 uses a DNN to detect a weak region (partial region), and outputs information of the weak region. The weak region is a partial region that has a possibility that the misdetection or non-detection occurs in a DNN that has the same detection target as that of the DNN of the first region detection unit 100. The configuration of the DNN used in the weak region identification unit 110 is the same as that of the first region detection unit 100; for this reason, the description is omitted. The weak region identification unit 110 of the present embodiment performs identification of partial region, that is, identification of the weak region that has a possibility that the misdetection or non-detection occurs in a task of the region detection of the first region detection. The weak region may include, for example, a region in which players are crowding in a case of a sporting event, a region in which a lighting irradiating a target is drastically changed in a case of an indoor sporting event and a concert, and the like. In addition, a region that has a possibility that the misdetection or non-detection by the first region detection unit 100 occurs due to the limitation in the learning image 301, the network structure, and the like of the DNN of the first region detection unit 100 may be included. The DNN of the weak region identification unit 110 may be independent of the DNN of the first region detection unit 100, and the network structures of the DNNs may also be different between the DNN of the first region detection unit 100 and the DNN of the weak region identification unit 110.

The DNN of the first region detection unit 100 and the DNN of the weak region identification unit 110 may form a multitask DNN sharing a part of each DNN.

The correct answer image for the learning by the DNN of the weak region identification unit 110 may be the error map that indicates the detection error generated for calculating the loss by the loss calculation unit 320 during the processing of the learning stage of the DNN of the first region detection unit 100. As the error map used as the correct answer image for the weak region identification unit 110, an error map related to another DNN that has the same detection target as that of the DNN of the first region detection unit 100 but is independent of the DNN of the first region detection unit 100 may be used. In this case, it is desirable that the DNN of the first region detection unit 100 and the other DNN have done with the learning at a comparable level.

In the present embodiment, the detection result by the weak region identification unit 110 indicates the weak region with a rectangle and is outputted as an image in which the probability of existence of the weak region is applied to each rectangle. FIG. 2C illustrates an example of the binary image indicating the weak region as the detection result by the weak region identification unit 110. In this example, a region of a ball and a region near a boundary in which the background is changed greatly are inferred as the weak region. The inference result by the weak region identification unit 110 is not limited to such a specific example.

The second region detection unit 120 performs the region detection on the weak region detected in the inputted image by the weak region identification unit 110 by a method other than the neural network while setting, as the detection target, a foreground region that is the same as the foreground region as the detection target of the first region detection unit 100. Then, as the detection result, the second region detection unit outputs second foreground region information indicating the foreground region in the weak region. For example, the foreground region may be detected by a background difference method using a previously-obtained background image of the image inputted from the input device 1.

The integration unit 130 integrates the foreground region detected by the first region detection unit 100 and the foreground region detected by the second region detection unit 120 with each other and outputs the integration result of the foreground regions. The integration unit 130 corrects the weak region of the foreground region detected by the first region detection unit 100 with the foreground region detected by the second region detection unit 120. The integration method may be a logical sum of the detection result by the first region detection unit 100 and the detection result by the second region detection unit 120. The integration may be performed by weighting using the probability applied to each rectangle in the detection result by the weak region identification unit 110.

Figure 4:
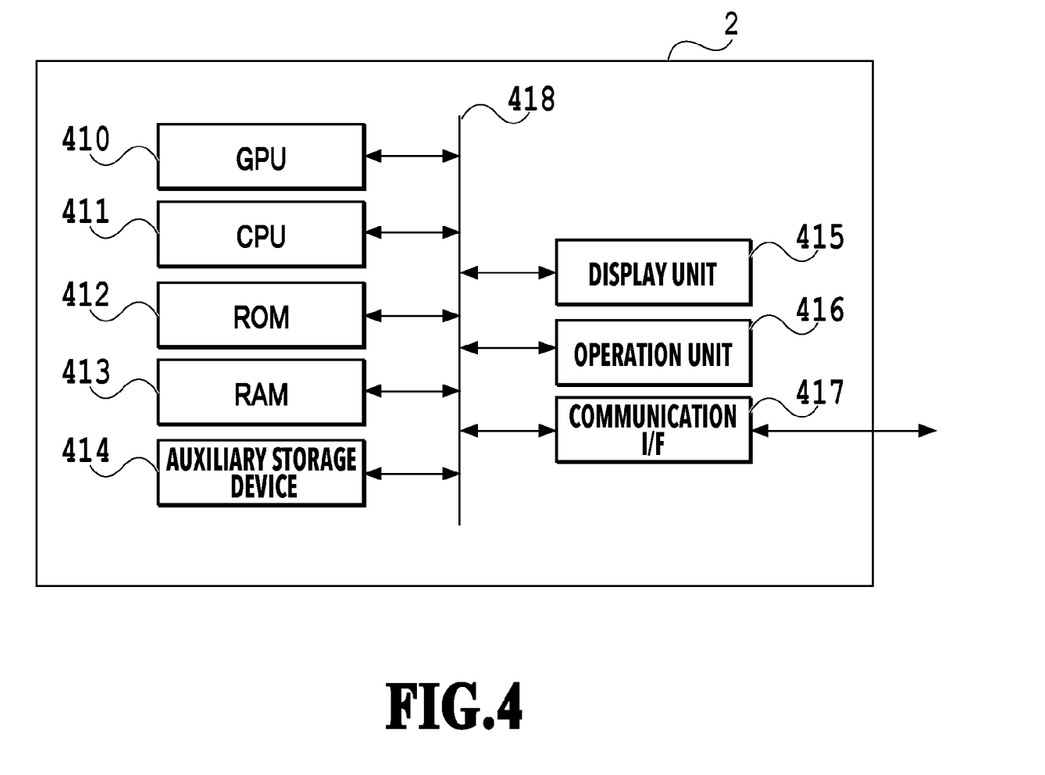
FIG. 4 is a hardware configuration diagram of the region detection device in Embodiment 1.

Next, a hardware configuration of the region detection device 2 is described using FIG. 4. The region detection device 2 includes a computation unit for performing image processing including a graphics processing unit (GPU) 410 and a central processing unit (CPU) 411. The region detection device 2 also includes a storage unit including a read only memory (ROM) 412, a random access memory (RAM) 413, and an auxiliary storage device 414. Additionally, the region detection device 2 includes a display unit 415, an operation unit 416, a communication I/F 417, and a bus 418.

The CPU 411 implements each function of the region detection device 2 illustrated in FIG. 1 by controlling the entirety of the region detection device 2 by using computer programs and data stored in the ROM 412 and the RAM 413. The CPU 411 also operates as a display control unit that controls the display unit 415 and an operation control unit that controls the operation unit 416.

The GPU 410 can perform efficient computation by performing much more parallel processing of data. In a case of performing the learning multiple times by using a learning model like the deep learning, it is effective to perform the processing by the GPU 410. For this reason, in Embodiment 1, the GPU 410 is used in addition to the CPU 411 for the processing of the region detection by the first region detection unit 100 and the weak region identification unit 110. Specifically, in a case of executing an inference program to perform the region detection by the first region detection unit 100 and the weak region identification unit 110, the computation may be performed by only either one of the CPU 411 and the GPU 410 or by cooperation of the CPU 411 and the GPU 410.

The region detection device 2 may include one or more pieces of dedicated hardware different from the CPU 411, and at least a part of the processing by the CPU 411 may be executed by the dedicated hardware. An example of the dedicated hardware may include an application-specific integrated circuit (ASIC), a field-programmable gate array (FPGA), a digital signal processor (DSP), and the like.

The ROM 412 stores a program and the like that need no change. The RAM 413 temporarily store a program and data supplied from the auxiliary storage device 414 and data supplied from outside through the communication I/F 417. The auxiliary storage device 414 is, for example, formed of a hard disk drive and the like and stores various data such as image data and sound data.

The display unit 415 is, for example, formed of a liquid crystal display, LED, and the like, and displays a graphical user interface (GUI) and the like for a user to operate the region detection device 2. The operation unit 416 is, for example, formed of a keyboard, mouse, joystick, touch panel, and the like, and receives an operation by the user and inputs various instructions to the CPU 411.

The communication I/F 417 is used for communication with a device outside the region detection device 2. For example, in a case where the region detection device 2 is connected with wire with the external device, a cable for communication is connected to the communication I/F 417. In a case where the region detection device 2 has a function of wireless communication with the external device, the communication I/F 417 includes an antenna. The bus 418 couples the units of the region detection device 2 with each other and transfers information.

In the present embodiment, the display unit 415 and the operation unit 416 exist inside the region detection device 2; however, at least either one of the display unit 415 and the operation unit 416 may exist as a different device outside the region detection device 2.

[Operation Flow]

Figure 5:
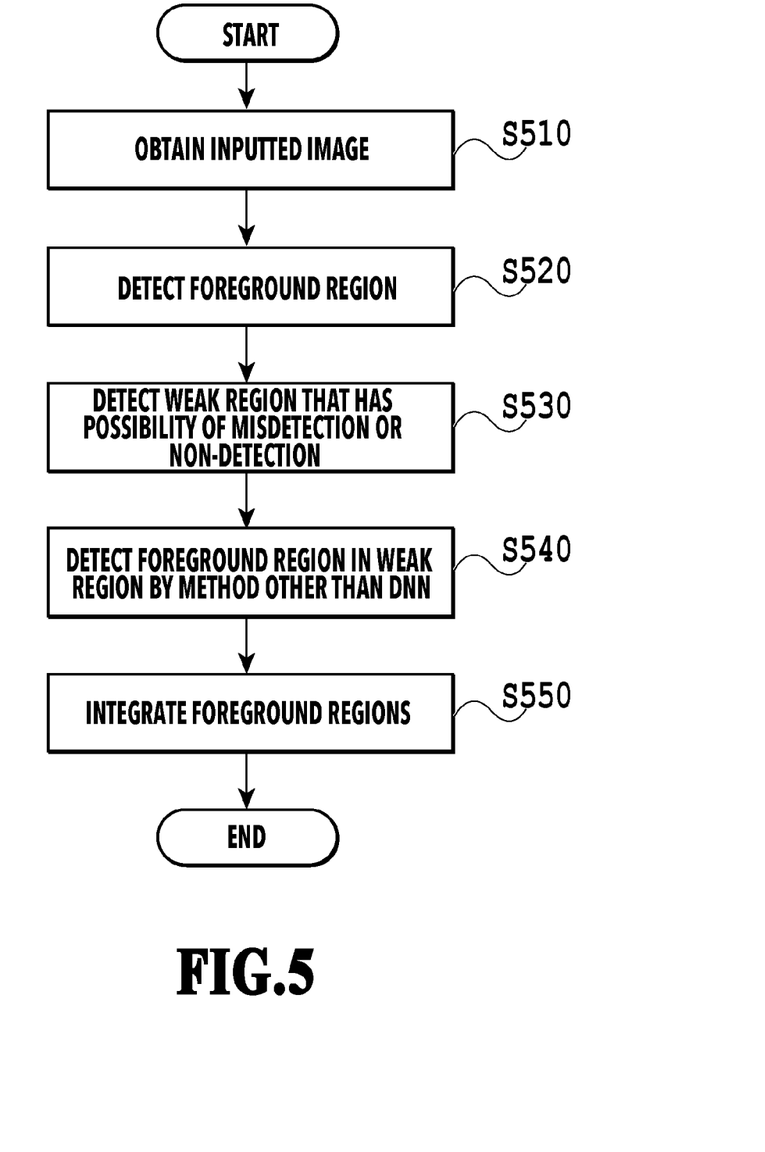
FIG. 5 is a flowchart illustrating operations of the region detection device in Embodiment 1.

A procedure of the processing in Embodiment 1 is described using a flowchart of FIG. 5.

In S510, the first region detection unit 100, the weak region identification unit 110, and the second region detection unit 120 read the inputted image from the input device 1.

In S520, the first region detection unit 100 detects a predetermined foreground region in the inputted image by using the DNN. In the present embodiment, as described above, the first region detection unit 100 extracts the foreground region by the method using the DNN. The weight and bias used in each layer of the DNN may be learned in advance and may also be updated based on a search result every time the region search is performed. The detection result of the foreground region can be binary data such as a binarized mask in which the foreground is a pixel value of 1 while the background is a pixel value of 0, or multi-value data such as a probability map.

In S530, the weak region identification unit 110 uses a DNN to detect the weak region, which has a possibility that the misdetection and non-detection occur during the region detection performed on the inputted image by using a DNN having the same detection target as that of the DNN of the first region detection unit 1X). As with the first region detection unit 100, the weight and bias used for each layer of the DNN of the weak region identification unit 110 may be learned in advance and may also be updated based on a search result every time the region search is performed. With a value equal to or greater than a predetermined threshold being set to each rectangle indicating the weak region in the inputted image, it is possible to set a region to be the detection target of the second region detection unit 120. In this case, the second region detection unit 120 performs the region detection only on a region to which a value equal to or greater than the predetermined threshold is set.

In S540, in the weak region detected by the weak region identification unit 110 within the inputted image read from the input device 1, the second region detection unit 120 detects a foreground region that is the same detection target as that of the first region detection unit 100 by a method other than the neural network. This detection result of the foreground region can be, for example, as with the detection result by the first region detection unit 100, multi-value data such as a probability map or binary data such as a binarized mask in which the foreground is a pixel value of 1 while the background is a pixel value of 0.

In S550, the integration unit 130 integrates the detection result by the first region detection unit 100 and the detection result by the second region detection unit 120 with each other. As described above, the integration method may obtain a logical sum of the two detection results. Additionally, for example, as expressed by Expression 1, the integration may be performed by weighting using the probability of the detection result by the weak region identification unit 110.

$$I_{out}=p_{110}I_{120}+(1-p_{100})I_{100} \qquad \text{(Expression 1)}$$

In this expression, $I_{out}$ represents the mask indicating the integrated foreground region to be outputted. $p_{110}$ represents the probability applied to the weak region detected by the weak region identification unit 110, $I_{120}$ represents the mask indicating the foreground region detected by the second region detection unit 120, and $I_{100}$ represents the mask indicating the foreground region detected by the first region detection unit 100. $I_{100}$ and $I_{120}$ may be binarized in advance depending on an output. The detection result after the integration is outputted by the output device 3.

As the descriptions above, according to the present embodiment, it is possible to perform the region detection with higher accuracy and stability on the inputted image. Additionally, it is possible to estimate and correct the partial region that has a possibility that the non-detection or misdetection occurs in the DNN.

The descriptions of the present embodiment are descriptions assuming a still image as the inputted image; however, the present embodiment is also applicable even if the inputted image is a moving image. In a case where the inputted image is a moving image, the first region detection unit 100, the weak region identification unit 110, the second region detection unit 120, and the integration unit 130 may process the moving image for each frame in accordance with time information such as a time code.

Embodiment 2

Figure 6:
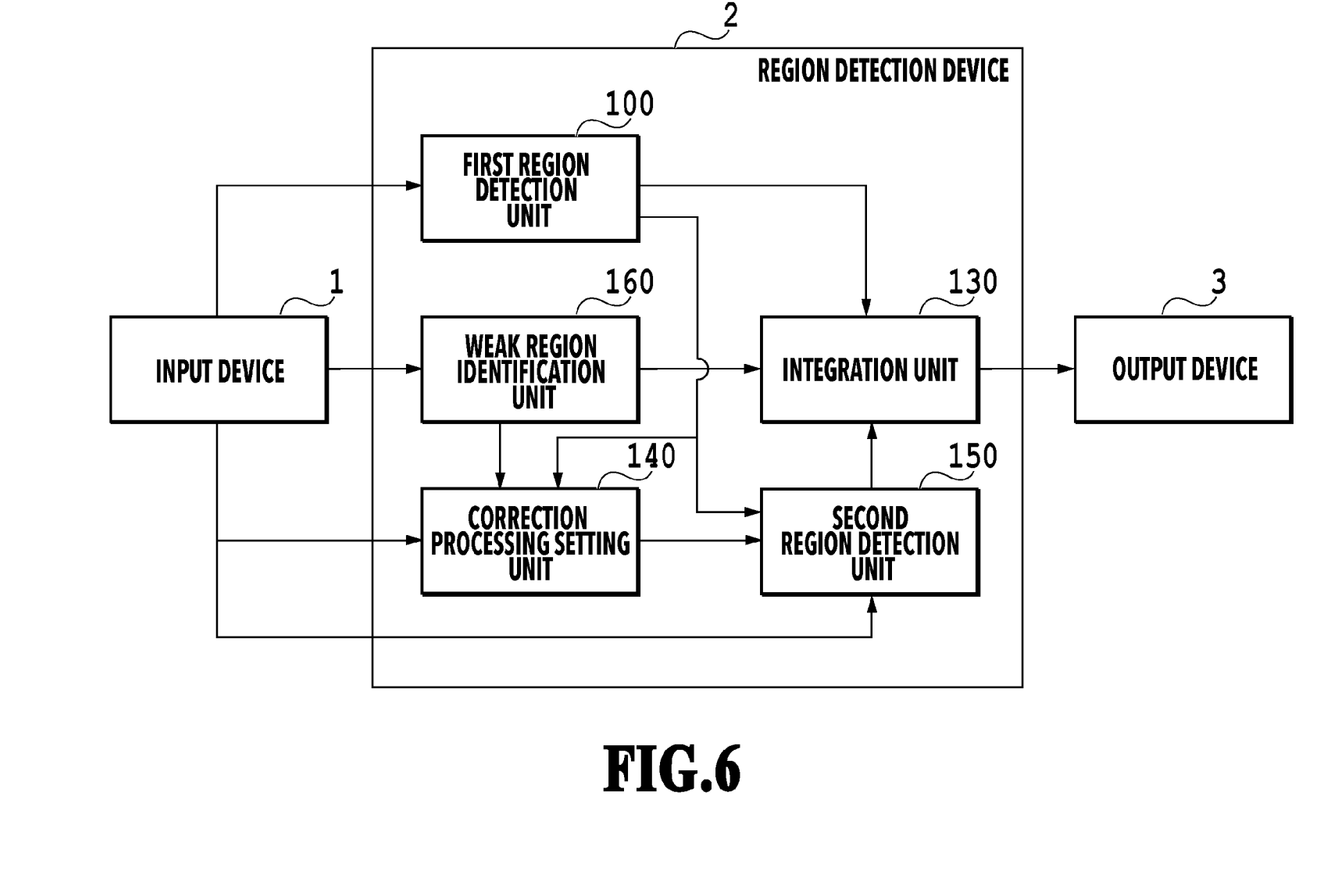
FIG. 6 is a configuration diagram of a region detection device in Embodiment 2.

FIG. 6 is a configuration diagram of the input device 1, the region detection device 2, and the output device 3 in the present embodiment. In Embodiment 2, the main point changed from Embodiment 1 is a weak region identification unit 160 and a correction processing setting unit 140. Embodiment 2 includes the region detection device 2 having the same hardware configuration as that of Embodiment 1 illustrated in FIG. 4.

[Configuration]

In addition to the input of the inputted image from the input device 1, information on the network structures of the input layer and the intermediate layers of the first region detection unit 100 is inputted to the weak region identification unit 160. The DNN of the weak region identification unit 160 may be, for example, a multitask DNN as illustrated in FIG. 7A that shares a part of the DNN with the first region detection unit 100.

Figure 7A:
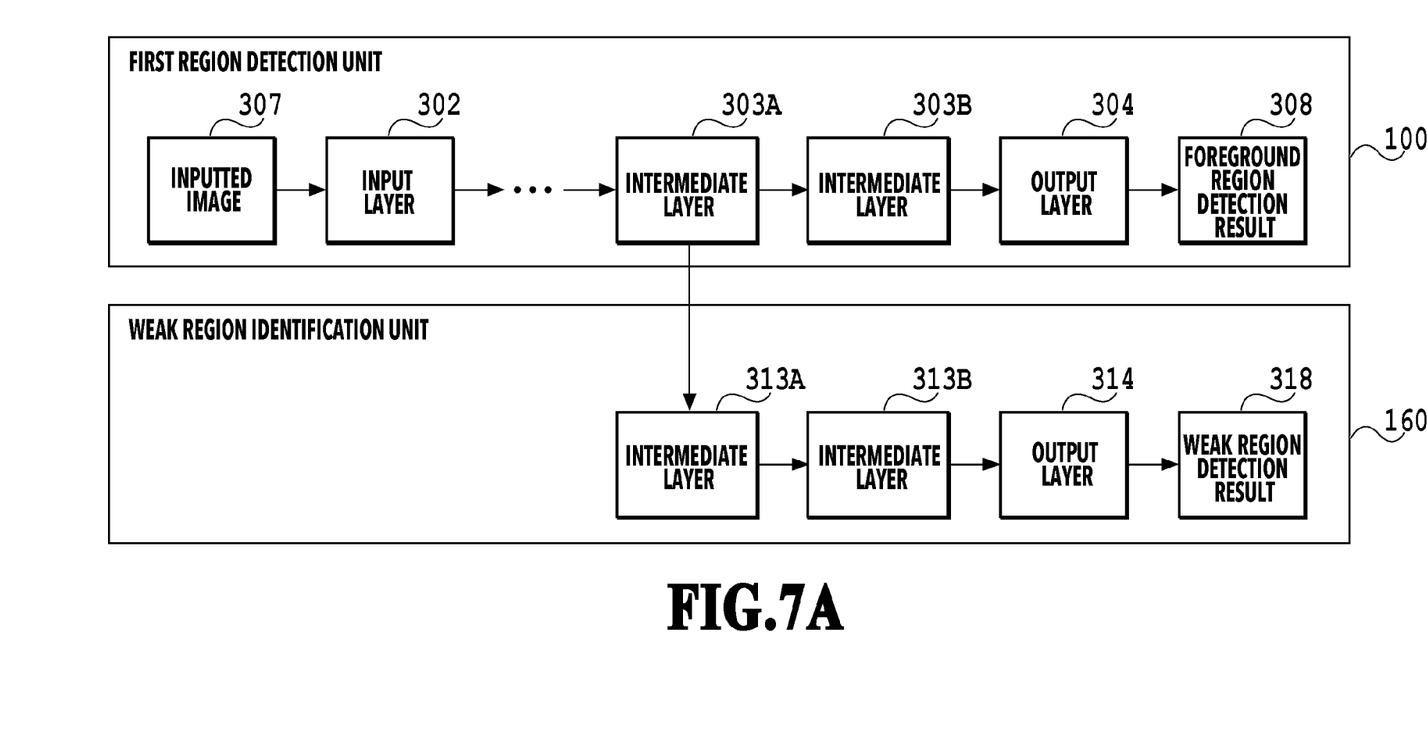
FIG. 7A is a diagram illustrating a deep neural network structure in Embodiment 2.

The weak region identification unit 160 illustrated in FIG. 7A processes an output diverged from the intermediate layer 303A of the DNN in the first region detection unit 100 by multiple intermediate layers 313A and 313B and an output layer 314, and outputs a detection result 318 of the weak region of the DNN in the first region detection unit 100.

In the learning by the first region detection unit 100, the loss calculated from the error map of the inference result by the first region detection unit 100 and the correct answer image is used, and the weight and bias of each of the input layer 302, the intermediate layers 303A and 303B, and the output layer 304 of the first region detection unit 100 is updated.

In the learning by the weak region identification unit 160, a loss calculated from an error map of the inference result by the weak region identification unit 160 and the correct answer image is used, and the weight and bias of each of the intermediate layers 313A and 313B and the output layer 314 of the weak region identification unit 160 is updated. In the learning by the weak region identification unit 160, the weight and bias of the input layer 302 and the intermediate layer 303A that are shared before the divergence of the first region detection unit 100 may be updated by the loss calculated from the error map of the inference result by the weak region identification unit 160 and the correct answer image.

Figure 7B:
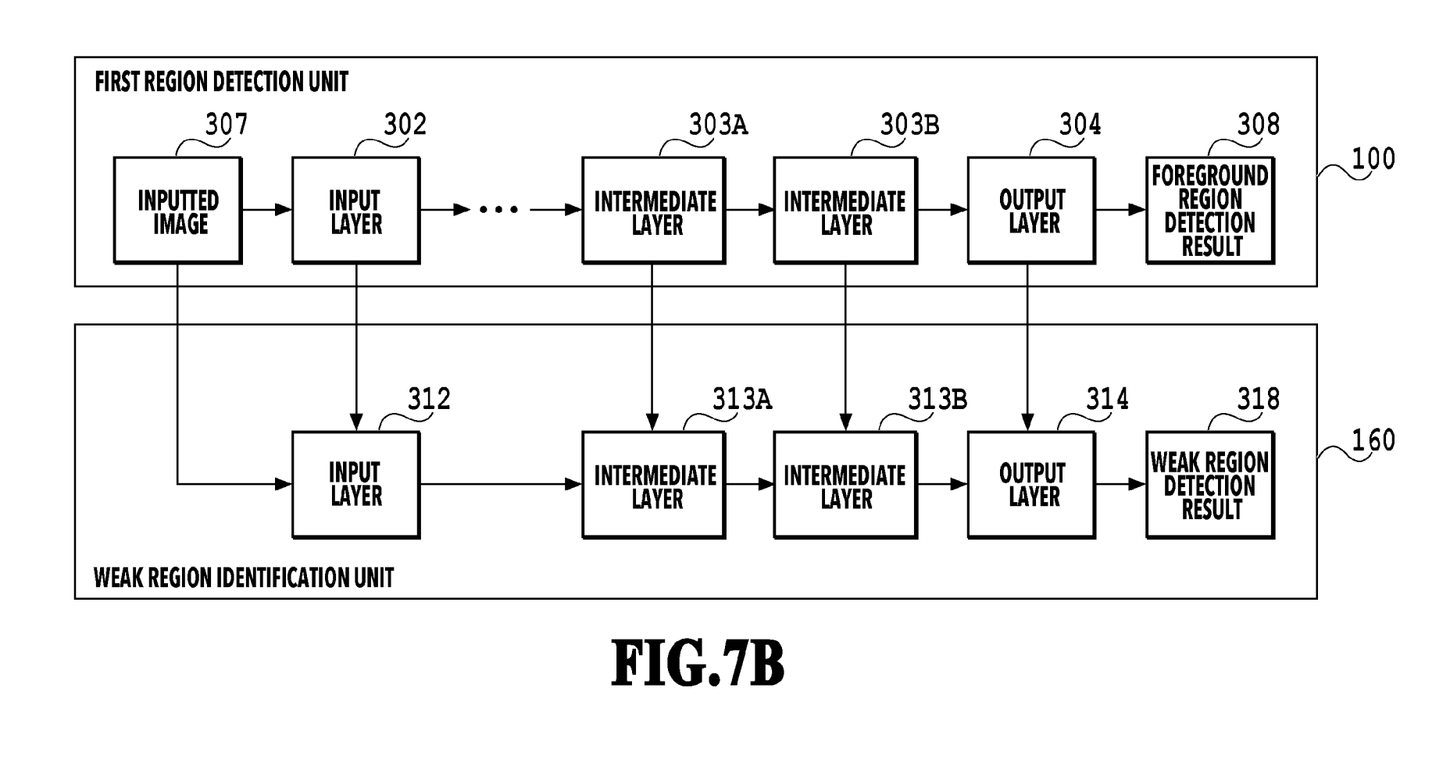
FIG. 7B is a diagram illustrating a deep neural network structure in Embodiment 2.

As one more example of the weak region identification unit 160, a DNN as illustrated in FIG. 7B may be applied. In the DNN of the weak region identification unit 160 illustrated in FIG. 7B, outputs from the input layer 302, the intermediate layers 303A and 303B, and the output layer 304 of the first region detection unit 100 are a part of inputs to the corresponding layers, and each layer of the first region detection unit 100 is incorporated in the network structure. During the learning, likewise, the loss of the DNN of the weak region identification unit 160 may be used to update the weight and bias of the DNN of the first region detection unit 100.

The DNN of the weak region identification unit 160 may be independent of the DNN of the first region detection unit 100 as with Embodiment 1.

Figure 8:
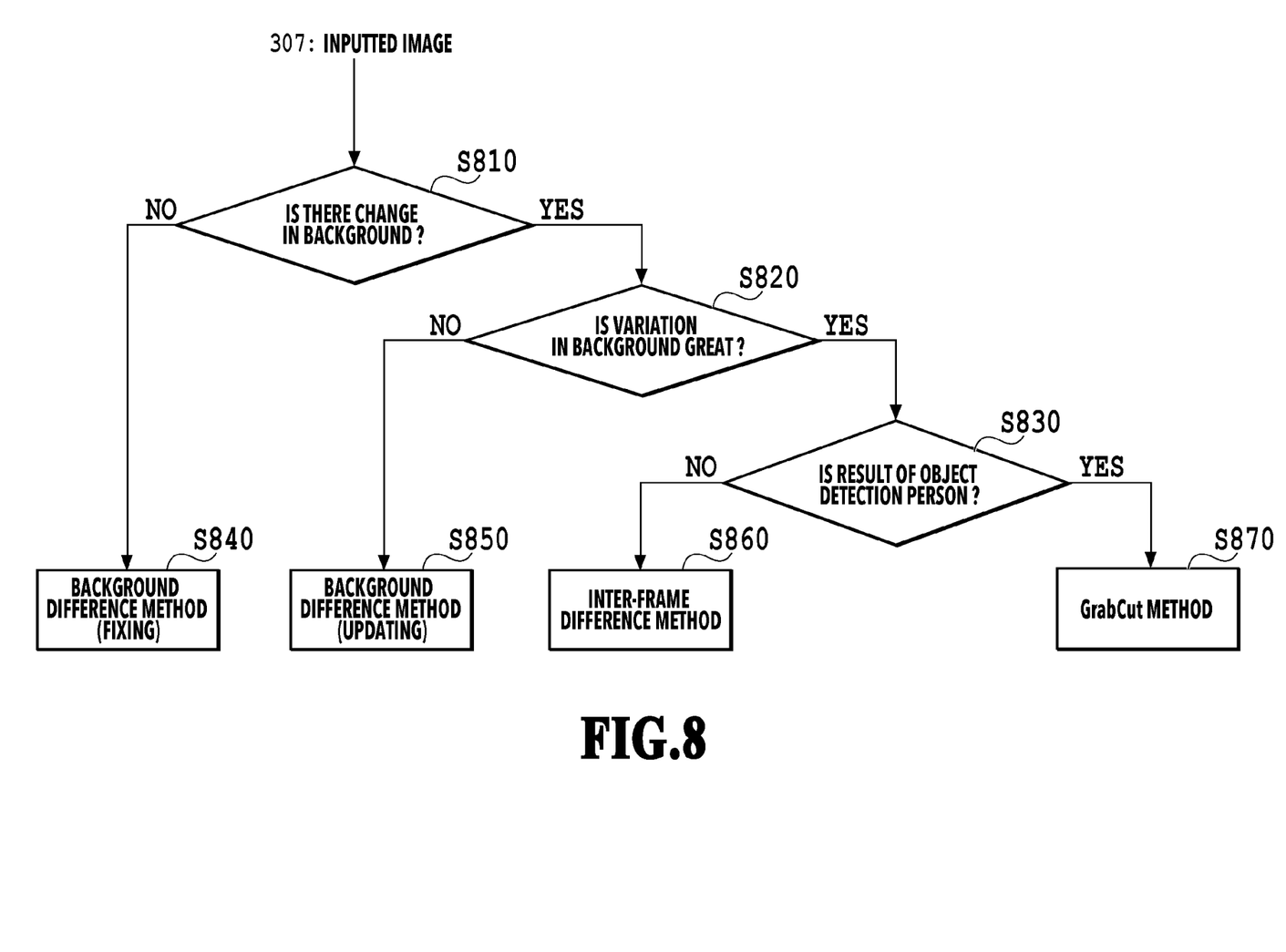
FIG. 8 is a flowchart illustrating operations of a correction processing setting unit in Embodiment 2.

Based on the inputted image from the input device 1, the correction processing setting unit 140 analyzes the features of the detection regions of the first region detection unit 100 and the weak region identification unit 160 and determines the correction processing by a second region detection unit 150 in accordance with the features. The features of the detection regions are extracted by using spatial position information and time information of the inputted image. In a case where, for example, a moving image of sporting event is processed, the correction processing setting unit 140 selects a region detection method other than the neural network based on a flow as illustrated in FIG. 8. In the present embodiment, there are prepared four methods, a background difference method of fixing a background (S840), a background difference method of sequentially updating a background (S850), an inter-frame difference method (S860), and a GrabCut method (S870), as the region detection method other than the neural network. For example, those region detection methods have the following advantages and disadvantages, respectively.

In the background difference method of fixing a background (S840), a dynamic object in a background such as, for example, shade made by a change in sunlight cannot be processed; for this reason, this is a method unsuitable for detecting a foreground region in an image in which a background is changed.

The background difference method of updating a background (S850) can deal with a background change within a certain range; however, this is a method unsuitable for detecting a foreground region in an image in which a background is changed rapidly such as a digital signage and an artificial lighting having a great change.

The inter-frame difference method (S860) is capable of detecting a foreground region even with a variation in a background region; however, this is a method unsuitable for detecting a foreground region that is still or moves slowly.

The GrabCut method (S870) can perform the processing with a still image and has no disadvantages that the above three methods have; however, this is unsuitable for detecting a foreground region with a color close to a background region, and thus the necessity of selecting a foreground region to be additionally detected manually is the disadvantage.

The correction processing setting unit 140 analyzes the foreground region detected by the first region detection unit 100 and the weak region detected by the weak region identification unit 110 of the inputted image and selects one from the four region detection methods depending on the weak region. The correction processing setting unit 140 is not limited to such a specific example.

In S810, the correction processing setting unit 140 checks a temporal change in the background region of the inputted image and determines whether the background has a change. If it is determined that there is no change in the background of the inputted image, the correction processing setting unit 140 sets the background difference method of fixing a background (S840) to the second region detection unit 150. If it is determined that there is a change in the background of the inputted image, the process proceeds to S820.

In S820, the correction processing setting unit 140 calculates a change amount of the background region and determines whether the calculated change amount of the background region is lower than a predetermined threshold set in advance. If the change amount of the background region is lower than the predetermined threshold, the correction processing setting unit 140 sets the background difference method of updating a background (S850) to the second region detection unit 150. If the change amount of the background region is equal to or greater than the threshold, the process proceeds to S830.

In S830, the correction processing setting unit 140 performs the image recognition on the foreground region of the inputted image. As a result of the image recognition of the foreground region, if it is determined that the foreground region includes a region corresponding to, for example, a ball moving fast that is used in a ball game, the inter-frame difference method (S860) is set to the second region detection unit 150. If it is determined that a region corresponding to a person is included in the foreground region, the GrabCut method (S870) is set to the second region detection unit 150.

[Operation Flow]

Figure 9:
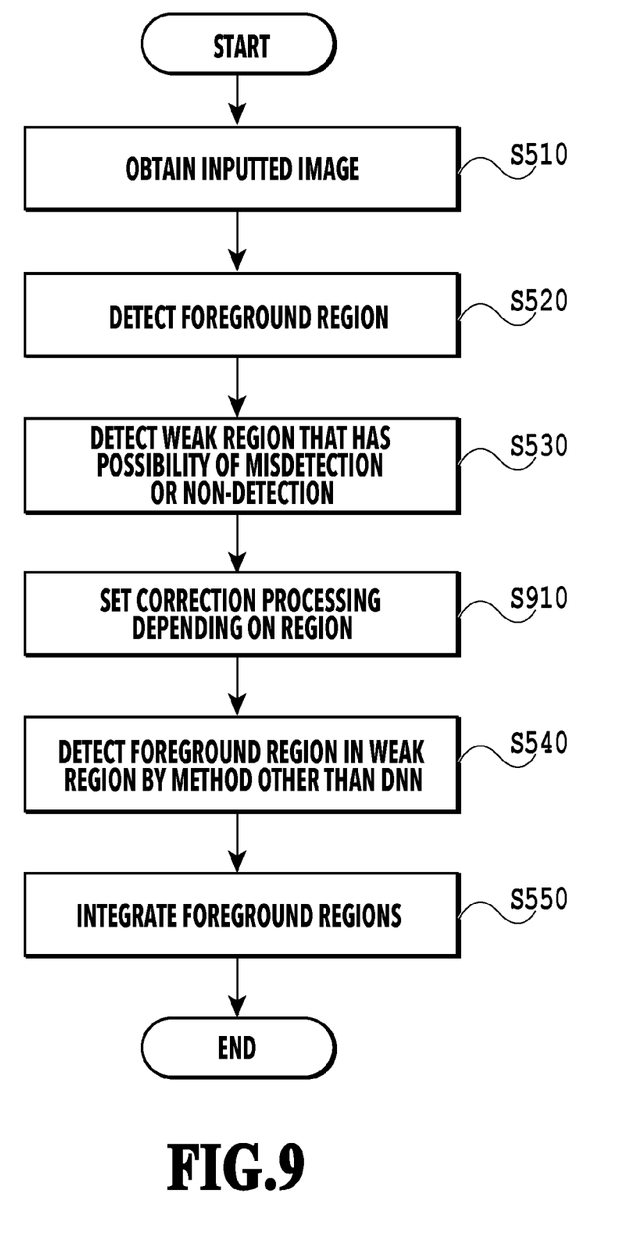
FIG. 9 is a flowchart illustrating operations of the region detection device in Embodiment 2.

A procedure of the processing in Embodiment 2 is described using a flowchart of FIG. 9. The operation flow of Embodiment 2 differs from the operation flow of Embodiment 1 in the existence of S910 between S530 and S540.

In S910, the correction processing setting unit 140 uses the inputted image obtained from the input device 1, the detection result by the first region detection unit 100, and the detection result by the weak region identification unit 160 to select a method for the region detection on the weak region by the above-described method illustrated in FIG. 8.

According to the present embodiment, it is possible to perform the region detection with higher accuracy and stability on the inputted image. It is possible to predict and correct the partial region that has a possibility that the non-detection or misdetection occurs in the DNN. Additionally, with an output from each layer of the first region detection unit 100 being inputted to each layer of the DNN of the weak region identification unit 160, the occurrence probability of the non-detection or misdetection by the first region detection unit 100 in the weak region detected by the weak region identification unit 160 is higher than that in Embodiment 1. Moreover, the occurrence probability of the non-detection or misdetection by the first region detection unit 100 in a region that is not identified as the weak region by the weak region identification unit 160 is lower than that in Embodiment 1.

The configurations of Embodiments 1 and 2 are to perform the region search by using DNNs in the first region detection unit 100 and the weak region identification units 110 and 160; however, it is not limited to a DNN, and another neural network may be used.

Other Embodiments

In Embodiments 1 and 2, a case using a sporting event is described; however, the present disclosure is not limited thereto. For example, it is also applicable to automatic tracking of a region corresponding to a predetermined object in an image captured by a monitoring camera, vehicle recognition in an image captured by an in-vehicle camera, and the like.

According to the present disclosure, it is possible to detect a foreground region accurately even with a neural network.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-074870, filed Apr. 27, 2021, which is hereby incorporated by reference wherein in its entirety.

What is claimed is:

1. An image processing apparatus comprising:
at least one processor or circuit configured to function as:
a first foreground region detection unit configured to detect, based on a first neural network, a first foreground region in an inputted image;
a partial region identification unit configured to identify, based on a second neural network, a partial region in the inputted image in which a foreground region is detected by a method other than a neural network;
a second foreground region detection unit configured to detect, based on a detection result by a method other than a neural network, a second foreground region in the partial region; and
an output unit configured to output, based on the first foreground region, the partial region, and the second foreground region, a third foreground region indicating a foreground region in the inputted image,
wherein the second neural network performs learning based on a detection error of the first neural network.

2. The image processing apparatus according to claim 1, wherein
the partial region is a probability map that applies a probability of the existence of the partial region to each position, and
the output unit generates the third foreground region based on a region that is obtained by weighting a region indicated by the first foreground region and a region indicated by the second foreground region in accordance with the probability map and integrating the regions with each other.

3. The image processing apparatus according to claim 1, wherein
the first neural network and the second neural network are neural network independent from each other.

4. The image processing apparatus according to claim 1, wherein
the first neural network and the second neural network share at least a part thereof.

5. The image processing apparatus according to claim 4, wherein
as an input to an input layer, an intermediate layer, or an output layer of the second neural network, an output from an input layer, an intermediate layer, or an output layer of the first neural network is used.

6. The image processing apparatus according to claim 1, wherein
as the method other than a neural network, the second foreground region detection unit selects a method other than a neural network based on at least either of spatial position information and time information related to the partial region of the inputted image.

7. The image processing apparatus according to claim 6, wherein
the method other than a neural network is one of a background difference method of fixing a background, a background difference method of updating a background, an inter-frame difference method, and a GrabCut method.

8. The image processing apparatus according to claim 1, wherein
a neural network that is used in the first foreground region detection unit and the partial region identification unit is a deep neural network including a plurality of intermediate layers.

9. An image processing method comprising:
detecting, based on a first neural network, a first foreground region in an inputted image;
identifying, based on a second neural network, a partial region in the inputted image in which a foreground region is detected by a method other than a neural network;
detecting, based on a detection result by a method other than a neural network, a second foreground region in the partial region; and outputting, based on the first foreground region, the partial region, and the second foreground region, a third foreground region indicating a foreground region in the inputted image, wherein the second neural network performs learning based on a detection error of the first neural network.

10. A non-transitory computer-readable storage medium storing a program that causes a computer to execute steps of an image processing method comprising:

detecting, based on a first neural network, a first foreground region in an inputted image;

identifying, based on a second neural network, a partial region in the inputted image in which a foreground region is detected by a method other than a neural network;

detecting, based on a detection result by a method other than a neural network, a second foreground region in the partial region; and outputting, based on the first foreground region, the partial region, and the second foreground region, a third foreground region indicating a foreground region in the inputted image, wherein the second neural network performs learning based on a detection error of the first neural network.

* * * * *